April 26, 1955  M. V. HOOVER  2,707,250
INTERLOCK CIRCUIT
Filed July 2, 1951
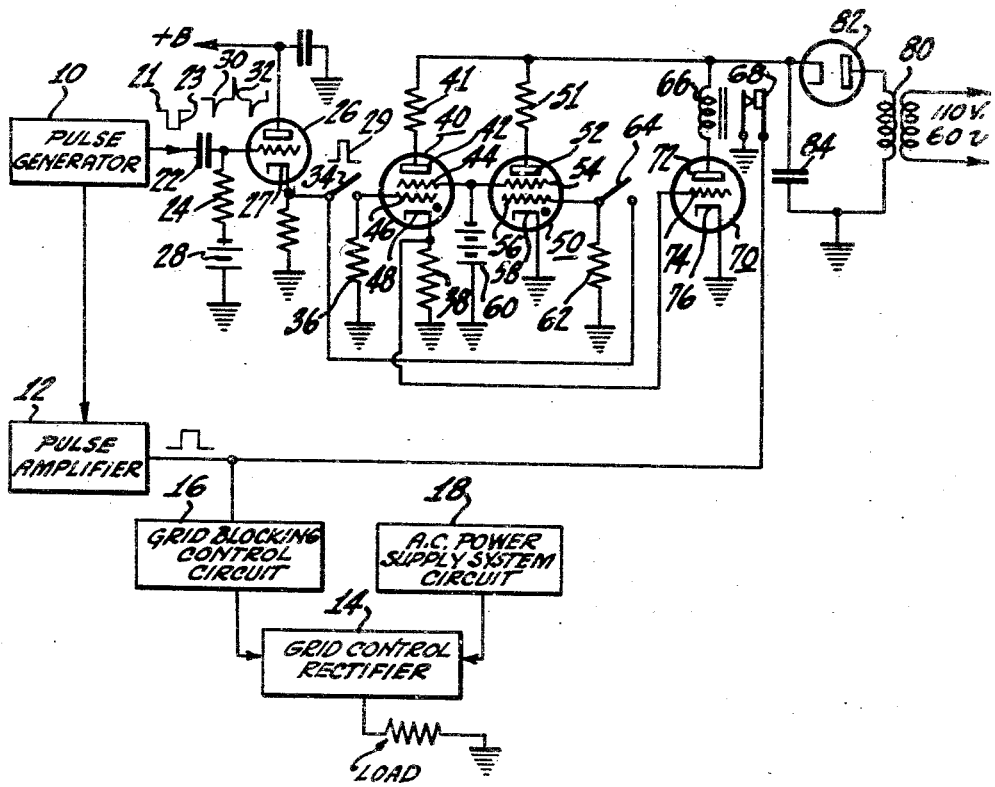
INVENTOR
MERLE V. HOOVER
BY
ATTORNEY United States Patent Office 2,707,250
Patented Apr. 26, 1955

2,707,250

INTERLOCK CIRCUIT

Merle V. Hoover, Mountville, Pa., assignor to Radio Corporation of America, a corporation of Delaware Application July 2, 1951, Serial No. 234,842

7 Claims. (Cl. 315—163)

This invention relates to protective circuits for power supplies and more particularly to interlock circuits for pulsed high power rectifier systems.

A popular method for controlling the output power supplied by high power, grid controlled rectifiers is to apply pulses to the grid of such a reticfier so that the rectifier is made to conduct only during a portion of a cycle or a number of cycles of the alternating current being rectified. The time of the application of a pulse within a cycle or a number of cycles determines, of course, the average amount of power available during that cycle. Thus controlling the application of keying pulses to the rectifier grid, the power output of the power supply system may be controlled in a manner which is servile to the grid keying pulses.

Since a pulse grid controlled rectifier does not conduct in the absence of a keying pulse, a simple method for controlling the starting or stopping of such a rectifier is provided by the use of a sort-circuiting switch across the pulse source while is used to allow keying pulses to be applied to the rectifier grid or to be shorted out, as is desired. However, this simple method of on-off control does present certain problems which can have deleterious effects. These effects are prevented by the use of a novel interlock circuit which is an embodiment of the present invention. These harmful effects can occur when the short circuiting switch is opened near the end of the keying pulse to turn on the rectifier or when the short circuiting switch is closed near the beginning of a keying pulse to turn off the rectifier. The rectifier and its associated circuits are not fast enough to resolve rapid switch on-pulse off commands or pulse on-switch off commands or pulse on-switch off commands as occur in these two instances and the rectifier will not obey the keyer pulse in the first instance or the switch off action in the second instance. In order to prevent this type of operation, the proper time to apply or remove the keying pulse operation of a pulse grid rectifier is in the interval between pulses. In this way no rapid on-off commands to the rectifier system can occur.

Accordingly, it is an object of the present invention to provide an interlock circuit for a pulse rectifier system which permits starting or stopping of the system only in the interval between pulses.

It is a further object of the present invention to provide a novel interlock circuit for the protection of a pulsed rectifier system.

It is still a further object of the present invention to provide a novel and fast acting interlock relay control circuit.

These and other related objects of the present invention are attained by utilizing a relay whose contacts short-circuit the keying pulses which are applied to the control circuits of the grid rectifier. The relay winding is in series with a vacuum tube which is controlled by a gas tube. When the gas tube is fired, the vacuum tube draws an increased current through the relay winding, thus operating the relay. A second gas tube, connected across the first gas tube, serves to deionize it when it is fired which results in the relay contacts being released. The gas tube grids are each connected through a separate, normally open switch to a circuit which generates firing pulses only responsive to the trailing edges of the keying pulses. By closing either of these switches the shorting relay contacts are opened or closed. However this occurs only during an interval between keying pulses.

A more complete understanding of the invention can be had by reference to the following description of an illustrative embodiment thereof, when considered in connection with the accompanying drawing, which is a partial schematic, partial circuit diagram of an embodiment of the invention.

The drawing shows schematically the essential features of a pulsed grid rectifier power supply system which are required to illustrate the interlock circuit which is an embodiment of the present invention. The interlcok circuit is shown as a circuit diagram which is connected to the schematic diagram. A pulse generating circuit 10 generates pulses which are applied to a pulse amplifier 12. The output of the pulse amplifier 12 is applied to the grid circuit of a pulsed grid rectifier 14 through a rectifier grid blocking control circuit 16. The pulse generating circuit 10 and pulse amplifier 12 are represented as rectangles, since these are circuits which are well known in the art. The pulse grid rectifier may be of the type known commercially as an "ignitron." Power to be rectified is applied to the rectifier from an A. C. power supply circuit 18. The rectifier blocking control circuit 16 is representative of all the grid blocking control circuits which are normally used with a pulsed grid rectifier in high power applications. These circuits are well known in the art and need not be redescribed here.

A shorting switch is provided at the input to the grid blocking control circuit 16. This shorting switch takes the form of contacts 68 actuated by relay coil 66. In the position in which the shorting contacts are drawn, the rectifier 14 will not conduct. When the switch contacts 68 are open, keying pulses are applied to the rectifier grid circuits at a desired repetition rate and pulse length so as to determine the average output power derived from the rectifier. As was indicated above, if the shorting contacts 68 are closed just after a keying pulse has begun (i. e., the rectifier has just begun to operate), then, since the rectifier and its circuits are not fast enough to follow the rapid commands, the rectifier will continue to operate despite the fact that the keying pulse eventually ends. Thus the rectifier will attempt to operate in a continuous manner. As a consequence, an overload will occur and damage the load which, with the associated apparatus, is usually constructed for a pulsed type of operation. Also, assuming the shorting contacts 68 are closed and it is desired to turn on the rectifier, if the switch contacts are opened near the end of a keying pulse, the rectifier will continue to operate after the pulse passes since its grid circuits are not sufficiently fast to detect the ending of the pulse so quickly after the rectifier has been turned on. As a result, damage due to overload will probably be done to the rectifier and/or the load. The interlock circuit which is an embodiment of this invention operates to obviate these difficulties by permitting the pulsed rectifier to be connected to the pulse source only during the interval between keying pulses.

A negative pulse output 21 is derived from the pulse generating circuit. This is differentiated by means of a series condenser 22 and shunt resistor 24 connected to the pulse generating circuit. A cathode follower 26 is biased by means of a battery 28 connected to resistor 24 to be responsive only to the positive portion 32 of the differentiated pulse 30. This positive portion 32 occurs only in response to the trailing edge 23 of the pulse 21 which is applied to the differentiating circuit. The output of the cathode follower 26 consequently is a pulse 29 which is generated responsive in phase relationship with respect to the trailing edge 23 of the keying pulse 21.

A first gas tube 40 of the thyratron type has its control grid 46 connected to the cathode 27 of the cathode follower 26 through a normally open switch 34. A grid leak resistor 36 is connected between grid and ground of this first gas tube. A cathode load resistor 38 is connected between the cathode 48 of the first gas tube 40 and ground. A second gas tube 50 is also provided which has its cathode 58 grounded, its control grid 56 connected to ground through a grid leak resistor 62 and to the cathode of the cathode follower 26 through a normally open switch 64. The shield grids 44, 54 of the gas tubes are connected to a negative bias source 60 which serves to maintain these tubes normally non-conductive.

A relay has its operating winding 66 connected in series with the anode 72 of a vacuum tube 70. The grid 74 of the vacuum tube is connected to the cathode 48 of the first gas tube 40. The vacuum tube cathode 76 is connected to ground. The relay contacts 68 are normally closed and are connected so as to shunt the input to the grid rectifier 14.

A source of operating potential is provided for the two gas tubes and the series connected relay winding and vacuum tube. This consists of a transformer 80 which is excited from the usual 110 volt 60 cycle source of supply. The secondary of the transformer has connected thereacross a half-wave diode rectifier 82 in series with a filter condenser 84. The first and second gas tubes 40, 50 have their anodes 42, 52 connected respectively through a first and second anode load resistor 41, 51 to the junction between the diode 82 and the filter condenser 84. The free end of the relay winding is also connected to this junction point. The value of the anode load resistor 41 of the first gas tube 40 is much higher than the anode load resistor 51 of the second gas tube 50. The value of the first anode load resistor 41 is selected to have a long time constant when considered with the filter condenser. The second anode load resistor 51 has a value selected to provide a time constant such that the filter condenser 84 can be substantially discharged within half a cycle of the 60 cycle source. The vacuum tube 70 may be permitted to draw current which may be considered in the nature of a priming current for the relay since it is insufficient to open the relay contacts but does permit more rapid closing. The operation of the interlock circuit is as follows:

If it is desired to permit the grid control rectifier 14 to be pulsed, the switch 34 connected to the first gas tube is momentarily closed. The first keying pulse 21 that occurs after closing the switch 34 will provide a pulse 29 at the cathode follower output which occurs responsive to the trailing end of the keying pulse. This will cause the first gas tube 40 to fire. The manually controlled switch 34 need be only momentarily operated since, in the usual fashion of gas tubes, when the tube fires, the control grid loses control. Accordingly, a positive potential is applied to the control grid of the vacuum tube. This causes an increase in the current drawn through the relay winding 66 thus opening the relay contacts 68. Due to the inherent time lag in the operation of the interlock circuit, despite the fact that the thyratron is fired responsive to the trailing edge of a keying pulse, the actual opening of the relay contacts occurs at a small interval subsequent thereto but still within the interval between keying pulses. Thus the interlock serves to protect the rectifier against any difficulty which may occur upon starting.

If it is desired to stop the pulsed grid rectifier, the switch 64 connected to the grid 56 of the second gas tube 50 is momentarily closed. The next pulse 29 which is generated responsive to the trailing edge of the keying pulse 21 will cause the second gas tube 50 to fire. By virtue of the low value of the second anode load resistor, 51, this presents a very low impedance across the first gas tube 40 and drops the anode voltage of the first gas tube below its extinction value. The first gas tube is thus extinguished. The voltage applied to the grid 74 of the vacuum tube 70 accordingly drops to zero and the relay contacts 68 are permitted to close. Furthermore, by virtue of the low impedance of the second gas tube which is presented when it is ignited, a certain amount of current is shunted thereby and thus is prevented from entering the relay winding-vacuum tube circuit, thus further insuring a very rapid opening of the relay contacts.

The second gas tube is extinguished on the next half cycle of the 60 cycle supply which goes negative. This occurs since the low value of the anode load resistor 51 rapidly discharges the filter condenser 84 to a value below the ignition of the second gas tube. It should be noted that the closing of the rectifier 14 also occurs within the interval between two keying pulses. Thus the interlock circuit prevents harmful starting and stopping of the system.

The interlock circuit shown and described herein also has independent utility as a relay control or relay drive circuit. The relay winding is not placed in the circuit of a thyratron tube and consequently the energy stored in the winding does not serve to slow up the ionization or deionization time of a gas tube with the consequent troubles. Furthermore, by permitting a vacuum tube in series with the relay winding to be biased to draw an amount of current which is just below the required operating current of the relay, a very fast-acting relay control circuit is obtained.

As an operative example of the interlock circuit, but not to be construed as the sole utilizable values the following values for the tube, resistors and condensers are supplied.

Condensers:
  22, 0.1 mfd.
  84, 8 mfd.
Resistors:
  24, 1 megohm
  26, 10,000 ohms
  62, 10,000 ohms
  38, 200 ohms
  41, 5,000 ohms
  51, 5 ohms
Tubes:
  26, 6J5
  40, 50, 2050
  70, 6N7
  82, 6W4

From the above description, it will be seen that a novel, fast-acting, interlock circuit which acts to protect a pulsed rectifier power supply system against harmful on-off switching action is provided.

What is claimed is:

1. In a gaseous rectifier pulsing system wherein pulses are applied from a source through a rectifier control circuit to key on said rectifier, an interlock circuit to protect said rectifier system against being started or stopped during a keying pulse comprising switch means to prevent application of pulses to said rectifier control circuit, means to generate a pulse responsive only to the trailing edge of a pulse from said source, a first inoperative means to render said switch means inoperative responsive to a pulse applied from said pulse generating means, means to render said first means operative when desired, a second inoperative means to render said first means inoperative when it is operative responsive to a pulse applied from said pulse generating means whereby said switch means is rendered operative, and means to render said second means operative when desired.

2. In a gaseous rectifier pulsing system wherein pulses are applied from a source through a rectifier control circuit to key on said rectifier, an interlock circuit to protect said rectifier system against being started or stopped during a keying pulse comprising, a relay having an operating winding and a pair of normally closed contacts connected across the input to said rectifier control circuit, a grid controlled vacuum tube connected in series with said relay operating winding, means to generate a pulse responsive only to the trailing edge of a pulse from said source, a first inoperative means to raise the conduction of said vacuum tube to open said relay contacts responsive to a pulse applied from said pulse generating means, switch means to render said first means operative when desired, a second inoperative means to render said first means inoperative when operative responsive to a pulse applied from said pulse generating means whereby the conduction of said vacuum tube is lowered and said relay contacts are closed and switch means to render said second means operative when desired.

3. An interlock system as recited in claim 2 wherein said means to generate a pulse responsive only to the trailing edge of a pulse from said source includes a differentiating circuit, a vacuum tube connected to receive the output from said differentiating circuit, and means to bias said vacuum tube to be responsive only to a trailing portion of a pulse differentiated by said circuit.

4. An interlock system as recited in claim 2 wherein said first and second means include a first and a second gas tube, each having a cathode, anode and control grid electrode, a cathode load resistor having one end connected to the cathode of said first gas tube, the cathode of said second gas tube being connected to the other end of said cathode load resistor, and a first and a second anode load resistor having one of their ends respectively connected to each of the anodes of said first and second gas tubes, the other ends of said resistors being connected together, the value of said second anode load resistor being very low relative to the value of said first anode load resistor whereby when said second gas tube is fired it deionizes said first gas tube.

5. In a gaseous rectifier pulsing system wherein pulses are applied from a source through a rectifier control circuit to key on said rectifier, an interlock circuit to protect said rectifier system against being started or stopped during a keying pulse comprising a relay having an operating winding and a pair of normally closed contacts connected across the input to said rectifier control circuits, a grid controlled vacuum tube connected in series with said relay operating winding, means to differentiate pulses from said source, means to generate pulses responsive only to the trailing portion of said differentiated pulses, a first and a second gas tube each having an anode, cathode and control grid, said second gas tube being coupled in shunt with said first gas tube, means to maintain said first and second gas tubes non-conducting, first and second normally open switches respectively connecting each of the control grids of said first and second gas tubes with said means to generate pulses, a cathode load resistor connected in series with the cathode of said first gas tube, said first gas tube cathode and the grid of said grid controlled vacuum tube being connected together, whereby operation of said first switch causes said first gas tube to fire responsive to said means to generate a pulse at the end of a keying pulse rendering said vacuum tube conductive and thereby opening said relay contacts to permit application of pulses to said rectifier and closing of said second switch causes said second gas tube to fire responsive to said means to generate a pulse at the end of a keying pulse, thereby extinguishing said first gas tube which reduces said vacuum tube conductivity and permits closing of said relay contacts.

6. In a gaseous rectifier pulsing system wherein pulses are applied from a source through a rectifier control circuit to key on said rectifier, an interlock circuit to protect said rectifier system against being started or stopped during a keying pulse comprising a relay having an operating winding and a pair of normally closed contacts connected across the input to said rectifier control circuit, a vacuum tube having anode, cathode and grid electrodes, said relay winding being in series with said anode, means to differentiate pulses from said source, means to generate pulses responsive only to the trailing portion of said differentiated pulses, a first and a second gas tube each having an anode, cathode and control grid, a first and second anode load resistor having one of their ends coupled to the respective anodes of said first and second gas tubes, said first resistor having a value larger than said second load resistor, a source of operating potential coupled to the other ends of said first and second resistors and to the free end of said relay winding, means to maintain said first and second gas tubes non-conducting, first and second normally open switches respectively connecting each of the control grids of said first and second gas tubes with said means to generate pulses, a cathode load resistor connected in series with the cathode of said first gas tube, said first gas tube cathode and the grid of said grid controlled vacuum tube being connected together, whereby operations of said first switch causes said first gas tube to fire responsive to said means to generate a pulse at the end of a keying pulse rendering said vacuum tube conductive and thereby opening said relay contacts to permit application of pulses to said rectifier and closing of said second switch causes said second gas tube to fire responsive to said means to generate a pulse at the end of a keying pulse, thereby extinguishing said first gas tube which reduces said vacuum tube conductivity and permits closing of said relay contacts.

7. An interlock circuit as recited in claim 6 wherein said source of operating potential for said gas tubes includes an alternating current source, a halfwave rectifier and a filter condenser connected in series across said source, and wherein said first anode load resistor has a value which when considered with the value of said filter condenser provides a time constant substantially in excess of the time of occurrence of one half cycle of said alternating current, and said second anode load resistor has a value which when considered with the value of said filter condenser provides a time constant substantially less than one half cycle of said alternating current, thus permitting said second gas tube to deionize within a cycle of said alternating current.

References Cited in the file of this patent

UNITED STATES PATENTS

| | | |
|---|---|---|
| 1,597,760 | Burstyn | Aug. 31, 1926 |
| 1,654,950 | Toulon | Jan. 3, 1928 |
| 1,691,423 | Alexanderson et al. | Nov. 13, 1928 |
| 1,933,859 | Kern | Nov. 7, 1933 |
| 2,486,350 | Sunstein | Apr. 26, 1949 |
| 2,582,676 | Bordewick | Jan. 15, 1952 |
| 2,584,714 | Kirkpatrick | Feb. 5, 1952 |
| 2,590,826 | Scheneck | Mar. 25, 1952 |